July 6, 1937.  E. M. GODFREY, JR  2,086,358
VEHICLE WHEEL
Filed May 21, 1936
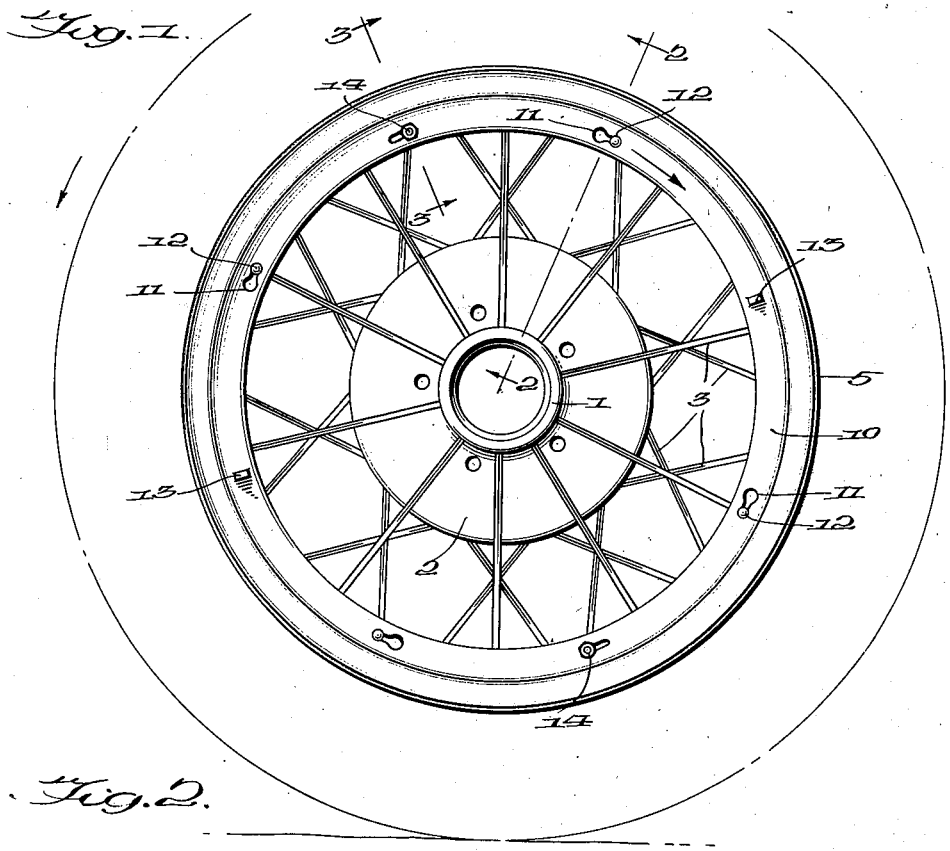
Inventor
Elmore M. Godfrey Jr.
By Cyrus Kehr
his Attorney Patented July 6, 1937

2,086,358

UNITED STATES PATENT OFFICE 2,086,358

VEHICLE WHEEL

Elmore M. Godfrey, Jr., Knoxville, Tenn.

Application May 21, 1936, Serial No. 81,112

6 Claims. (Cl. 152—20)

This invention relates to an improvement in vehicle wheels, and more particularly to a rolled sheet metal split type of tire rim, commonly referred to as a drop center rim.

The object of the invention is to provide a rim of this type upon which a tire may be readily and quickly mounted and demounted, by the provision of a split ring without, however, weakening the rim which is usually of one piece and which rim securely and effectively holds the tire in place on the wheel during normal operation of the wheel.

Heretofore, vehicle wheels particularly of the wire or disc types which have employed drop center rims, have been objectionable, inasmuch as it is very difficult to mount or dismount the tire thereon, but the present invention overcomes such objection by the use of a separate tire holding ring which forms a part of the rim and which may be detached from the remainder of the rim for ready removal of the tire or for mounting the tire on the rim, and yet when in place the ring forms a secure part of the rim without weakening the same.

A preferred embodiment of the present invention is illustrated in the accompanying drawing, in which:

Fig. 1 is a side elevation of the improved wheel;

Fig. 2 is a vertical sectional view therethrough on the line 2—2, of Fig. 1; and Fig. 3 is a similar view on the line 3—3, of Fig. 1.

The invention is shown as applied to a conventional type of wire wheel, although it is evident that it is equally applicable to a disc or similar wheel. As shown in the drawing, the wheel has a conventional hub 1, with which a brake drum 2 is shown as formed integral and extending outwardly from the hub 1 and brake drum 2, and securely fastened thereto are the usual radiating wire spokes 3, which are joined to the rim of the wheel.

The split rim of the present invention preferably consists of two sections 4 and 5, of which the section 4 is of the usual contour in cross section of an ordinary drop center rim, but with one of its side flanges removed and the section 5 substituted therefor. The section 4 has a base portion 6, to which the wire spokes 3 are joined and extending laterally from opposite sides of the base portion 6 are seats 7 and 7', to receive the normal beads of a tire, and a flange 8 extends upwardly from the seat 7.

The tire holding ring 5 is shaped at its outer portion corresponding with the lateral flange 8, and has a seat 9, in the inner edge thereof to abut against the edge of the section 4, at one side of the seat 7', so as to fit said portion and preserve the normal contour of an ordinary drop center rim. The inner portion of the tire holding ring 5, has a depending skirt 10 which fits the underside of the seat 7', and the lateral side of the center portion 6 to reinforce the same and for secure fastening of the two sections together, as shown in Figs. 2 and 3.

The skirt portion 10 of the tire holding ring 5 has a plurality of key hole slots 11 therein, in position to receive pins or rivets 12 attached to a side of the base portion 6, and projecting outwardly therefrom, as shown in Figs. 1 and 2. The pins or rivets 12, engage in the key hole slots 11, so as to securely hold the ring 5 in place on the main section 4 of the rim, but permit detachment of the ring 5 upon turning the ring in a direction opposite to the normal direction of rotation of the wheel, the slots 11 being so formed that turning of the ring in such direction opposed to the normal direction of rotation of the wheel disposes the heads of the pins or rivets 12 in the enlarged portions of the slots, so as to permit of detachment of the tire holding ring 5. To facilitate turning of the ring 5, relative to the main section 4 of the rim, lugs 13 are formed on the skirt 10 of the ring 5.

In order to securely fasten the ring 5 against accidental displacement, bolts or screws 14 may be used to extend through the skirt 10 into a lateral side of the base portion 6 of the rim.

Upon removal of the bolts or screws 14, the tire holding ring 5 may be readily removed from the main section 4 of the rim by turning thereof in the direction of the small arrow in Fig. 1, which permits the tire to be readily dismounted and replaced and yet the rim is not weakened by being split in this manner and it securely holds the tire thereon during ordinary operation. It will be noted that the main section 4 of the rim has both beads of the tire seated thereon, so that the ring 5 only takes the lateral pressure of one of the beads and not the radial weight sustaining pressure of the tire.

I claim:

1. A vehicle wheel rim having a depressed base portion in cross section provided with outwardly projecting sides terminating in lateral seats to receive the beads of a tire, one of said seats only having an outwardly flaring side flange thereon to hold the bead of the tire in place on the seat, and a tire holding ring at the outer side of the other seat and underlying the same to hold the other bead in place thereon.

2. A vehicle wheel rim having a depressed center portion in cross section provided with outwardly projecting sides terminating in laterally arranged seats to receive the beads of a tire, only one of said seats having an integral outwardly flaring side flange thereon to hold the bead of the tire in place thereon, a tire holding ring at the outer side of the other seat and abutting the edge thereof to hold the other bead in place on the seat, and means for detachably securing said tire holding ring in place.

3. A vehicle wheel rim of the dropped center type comprising a metallic section which in cross-section has a dropped center channel with radially projecting sides, each of said sides having a laterally projecting seat portion at the periphery thereof to receive the bead of a tire, only one of said laterally projecting seat portions having an outwardly flaring side flange thereon to hold the bead of the tire in place on the seat, and a tire holding ring at the outer side of the other seat portion with a groove in the inner side thereof receiving the edge of the adjacent laterally projecting portion and said ring flaring outwardly therefrom to hold the bead of the tire in place on the seat.

4. A vehicle wheel rim of the dropped center type comprising a metallic section which in cross-section has a dropped center channel with radially projecting sides, each of said sides having a laterally projecting seat portion at the periphery thereof to receive the bead of a tire, only one of said laterally projecting seat portions having an outwardly flaring side flange thereon to hold the bead of the tire in place on the seat, and a tire holding ring at the outer side of the other seat portion with a groove in the inner side thereof receiving the edge of the adjacent laterally projecting portion and said ring flaring outwardly therefrom to hold the bead of the tire in place on the seat, said tire holding ring having an inner skirt portion underlying the adjacent laterally projecting seat portion and extending along the face of the adjacent side of the center channel and abutting thereagainst and against the under side of the seat portion.

5. A vehicle wheel rim of the dropped center type comprising a metallic section which in cross-section has a dropped center channel with radially projecting sides, each of said sides having a laterally projecting seat portion at the periphery thereof to receive the bead of a tire, only one of said laterally projecting seat portions having an outwardly flaring side flange thereon to hold the bead of the tire in place on the seat, and a tire holding ring at the outer side of the other seat portion with a groove in the inner side thereof receiving the edge of the adjacent laterally projecting portion and said ring flaring outwardly therefrom to hold the bead of the tire in place on the seat, said tire holding ring having an inner skirt portion underlying the adjacent laterally projecting seat portion and extending along the face of the adjacent side of the center channel and abutting thereagainst and against the under side of the seat portion, said skirt portion having a plurality of key-hole slots therein, and headed pins fixed to the side of the channel and projecting through said slots for detachably holding the tire holding ring in place permitting detachment of said ring upon slight turning thereof, and locking means for said ring.

6. A vehicle wheel rim having a depressed center portion in cross-section provided with outwardly projecting sides terminating in lateral seats to receive the beads of a tire, only one of said seats having an integral outwardly flaring side flange thereon to hold the tire bead in place, and a tire holding ring at the lateral outer side of the other seat in abutting engagement with the lateral under face thereof to hold the other tire bead in place on said seat.

ELMORE M. GODFREY, Jr.